US012542118B2

(12) United States Patent
Ishida et al.

(10) Patent No.: US 12,542,118 B2
(45) Date of Patent: Feb. 3, 2026

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventors: Anne Ishida, Hamamatsu (JP); Masahiko Iwase, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 265 days.

(21) Appl. No.: 18/544,134

(22) Filed: Dec. 18, 2023

(65) Prior Publication Data

US 2024/0212651 A1 Jun. 27, 2024

(30) Foreign Application Priority Data

Dec. 27, 2022 (JP) ................................ 2022-209622

(51) Int. Cl.
*G10D 3/12* (2020.01)
*G10C 3/12* (2006.01)

(52) U.S. Cl.
CPC .................................... *G10C 3/12* (2013.01)

(58) Field of Classification Search
CPC ............ G10C 3/12; G10H 1/346; G10D 3/00
See application file for complete search history.

(56) References Cited

U.S. PATENT DOCUMENTS

2010/0282049 A1 11/2010 Yoshida
2020/0074968 A1* 3/2020 Suzuki .................. G10H 1/346

FOREIGN PATENT DOCUMENTS

JP 2003-167572 A 6/2003
JP 2010-262129 A 11/2010

* cited by examiner

*Primary Examiner* — Kimberly R Lockett
(74) *Attorney, Agent, or Firm* — Womble Bond Dickinson (US) LLP

(57) ABSTRACT

A keyboard device for a keyboard instrument, which is capable of realizing the same operation of an action as performed by that of a grand piano and enables to obtain the same key touch feeling and performability as provided by the grand piano during musical performance. The keyboard device includes a swingable key, an action unit operating in conjunction with depression of the key, and a hammer pivotally supported on a hammer support shaft of a hammer support and placed on the action unit via a hammer protrusion. The action unit includes a holder fixed to a rear end of the key, a repetition lever and a jack pivotally mounted to the holder, jack latching means for disengaging a hammer push-up portion of the jack from the hammer protrusion, and jack returning means for returning the hammer push-up portion to its position before disengagement.

5 Claims, 11 Drawing Sheets

KEYBOARD DEVICE FOR KEYBOARD INSTRUMENT

CROSS-REFERENCE TO RELATED APPLICATION

This application claims priority to Japanese Patent Application Number 2022-209622, filed on Dec. 27, 2022, the entire content of which is incorporated herein by reference.

BACKGROUND OF THE INVENTION

Field of the Invention

The present invention relates to a keyboard device for a keyboard instrument, such as an electronic piano, and more particularly to a keyboard device for a keyboard instrument, which realizes the same action as that of a grand piano.

Description of the Related Art

In general, a grand piano, which is an acoustic piano, is provided with an action which operates in accordance with depression of a key and causes a hammer to pivotally move upward, thereby causing the hammer to strike a string. An example of such an action is disclosed in Japanese Laid-Open Patent Publication (Kokai) No. 2003-167572 already filed by the present applicant. This action is provided for each key, and includes a wippen pivotally supported and placed on a rear portion of the key, a repetition lever and a jack each pivotally mounted to the wippen, a repetition spring for urging the repetition lever and the jack in a predetermined direction, and a repetition screw and a regulating button for restricting respective pivotal movements of the repetition lever and the jack.

The above-mentioned repetition lever is provided with a jack guide hole vertically extending therethrough, and a hammer is placed in the vicinity of the jack guide hole via a shank roller. Further, the above-mentioned jack is formed in an L shape in side view and has a hammer push-up portion extending in the vertical direction. A tip end of the hammer push-up portion is inserted into the jack guide hole of the repetition lever from below and movably engaged therewith in a front-rear direction, and is opposed to the shank roller.

In the grand piano including the action constructed as described above, when the key is depressed, the wippen pushed up by the rear portion of the key is pivotally moved upward, and accordingly, the repetition lever and the jack as well are moved upward. In accordance therewith, first, the repetition lever pushes up the hammer via the shank roller in a state held in sliding contact with the shank roller, to thereby cause the hammer to pivotally move upward. Then, the repetition lever is brought into contact with the repetition screw to be latched thereby, whereby the jack pushes up the hammer via the shank roller. Thereafter, when the hammer is pivotally moved immediately close to a position for striking a string stretched above, the jack is engaged with the regulating button and thereby disengages itself (escapes) from the shank roller. Such escapement of the jack releases the hammer from connection with the action and the key, and the hammer strikes the string in a free rotation state. Note that during the escapement of the jack, a click feeling is generated by a change in the touch weight (static load) of the key, specifically, by a sharp increase in the touch weight and a sharp decrease in the same immediately after the sharp increase, whereby a so-called let-off feeling is added to a key touch feeling sensed by a performer who plays the piano.

After that, the key is released, and at a timing in which the key is returned to approximately one third of keyboard depth, the repetition lever starts to operate and performs pivotal return movement by a spring force of the repetition spring in a predetermined direction, thereby pushing up the shank roller while causing the same to slide. With this, the jack performs the pivotal return movement by the spring force of the repetition spring in the predetermined direction, and returns to its original position, whereby even when the key does not completely return to its key-released position, it is possible to perform the next strike of the string.

On the other hand, in an electronic piano, as a keyboard device in which a hammer is pivotally moved in accordance with key depression and a let-off feeling analogous to that of the grand piano can be obtained, there has been known, for example, one disclosed in Japanese Laid-Open Patent Publication (Kokai) No. 2010-262129 already filed by the present applicant. This keyboard device for the electronic piano includes a key extending in a front-rear direction and configured to be swingable about a balance rail pin provided at about a longitudinal center thereof, an action chassis provided rearward of the key, a hammer pivotally supported by the action chassis and placed on a rear end of the key, and a let-off member mounted to the action chassis, for adding a let-off feeling to the key via the hammer during key depression.

In this electronic piano, when the key is depressed, a rear end thereof is moved upward, whereby the hammer is pushed up to pivotally move upward. During this pivotal movement of the hammer, an engagement portion of the hammer is temporarily engaged with the let-off member. In this case, the hammer is engaged with the let-off member such that the hammer compresses the let-off member, whereby a repulsive force from the let-off member acts on the hammer as a reaction against the engagement, and a touch weight of the key is sharply increased by rotational resistance generated at this time. Then, when the hammer is further pivotally moved until its engagement with the let-off member is released, the above-mentioned rotational resistance disappears, whereby the touch weight of the key sharply decreases. The sharp increase and decrease in the touch weight of the key adds a let-off feeling analogous to that of the grand piano to the key touch feeling.

In the grand piano, however, the number of components for constructing the action and the hammer is large, and further, a pivotally-moving member (hereinafter referred to as “the pivoting member” in this section) and a member for supporting the pivoting member (hereinafter referred to as “the support member” in this section) are connected with a pin. Specifically, the support member is formed such that a portion for supporting the pivoting member is formed in a bifurcated shape, and in a state in which the pivoting member is set inside the bifurcated portion, the pin is inserted through connecting holes of the two members, whereby the pivoting member is pivotally supported by the support member. As described above, in the grand piano, the number of the components of the action and the hammers is large, and what is more, work for assembling the action and the hammer to each other at the manufacturing time is troublesome and takes much time and labor. Further, in the grand piano, to appropriately actuate the action and the hammer, it is necessary to adjust the pivotally movable ranges of the components of the action, the hammer, and so forth, and the adjustment work is troublesome.

On the other hand, the electronic piano has a relatively simple construction that the hammer is directly pushed up by the rear end of the depressed key for pivotal movement, so that a change in load with respect to an amount of depression of a font end of the key being depressed, and a key touch feeling, such as a stop feeling of the key to be obtained at the time of full depression of the key, are delicately different from those in the grand piano. Further, although in the above-described electronic piano, the let-off member is used so as to obtain the let-off feeling by the escapement of the jack in the action of the grand piano, the hammer is not driven by a mechanism, such as the action of the grand piano. Therefore, in the electronic piano, a change in response feeling between a soft key strike and a hard key strike, and controllability of repeated strikes, staccato, trill, and so forth are different from those in the keyboard device of the grand piano. For this reason, it is difficult to say that controllability at the time of such high musical performance as performed in the marginal field of the performance of a grand piano can be sufficiently reproduced in the above-described electronic piano. Thus, the electronic piano has room for improvement.

SUMMARY OF THE INVENTION

It is an object of the present invention to provide a keyboard device for a keyboard instrument, which is capable of realizing the same operation of an action as performed by an action of a grand piano, while improving productivity and maintainability by reducing the number of components and the number of adjustment portions, compared with the action of the grand piano, thereby making it possible to obtain an equivalent key touch feeling and performability as provided by the grand piano during musical performance.

To attain the above object, the present invention provides a keyboard device for a keyboard instrument, including a key extending a predetermined length in a front-rear direction and configured to be swingable about a portion thereof at about a center of the key in a longitudinal direction thereof as a fulcrum, an action unit provided on a rear portion of the key, for operating in conjunction with depression of the key, a hammer support disposed rearward of the key, and a hammer extending a predetermined length in the front-rear direction and having a rear end thereof pivotally supported on a hammer support shaft extending in a left-right direction of the hammer support, the hammer being placed on the action unit via a protrusion formed immediately forward of the hammer support shaft such that the protrusion protrudes downward, for being driven upward by the action unit in accordance with depression of the key, wherein the action unit includes a holder fixed to a rear end of the key, a repetition lever having a jack guide hole extending through the repetition lever in a vertical direction and extending in the front-rear direction, the repetition lever being pivotally mounted to the holder, for placing the protrusion on an upper surface thereof at about the jack guide hole, the repetition lever moving upward in accordance with depression of the key to push up the hammer via the protrusion and thereby cause the hammer to pivotally move upward, a jack having a hammer push-up portion extending in the vertical direction and pivotally mounted to the holder, the hammer push-up portion having an upper end thereof inserted into the jack guide hole of the repetition lever from below and engaged with the jack guide hole such that the upper end is movable in the front-rear direction, the jack pushing up the hammer by the hammer push-up portion via the protrusion from partway through upward movement of the repetition lever caused by depression of the key, to cause the hammer to pivotally move upward, jack latching means for latching the jack partway through pushing-up of the hammer by the jack, thereby disengaging the hammer push-up portion of the jack from the protrusion, and jack returning means for returning the hammer push-up portion of the jack disengaged from the protrusion to its position before disengagement, when the depressed key is partway through returning to a key-released state.

With this construction, the action unit is provided on the rear portion of the key, and the hammer having the rear end thereof pivotally supported on the hammer support shaft of the hammer support is placed on the action unit via the protrusion formed immediately forward of the hammer support shaft. The action unit includes the holder fixed to the rear end of the key, and the repetition lever and the jack pivotally mounted to the holder. The hammer push-up portion of the jack is inserted into the jack guide hole of the repetition lever from below and is engaged therewith movably in the front-rear direction. The hammer is placed via the protrusion at about the jack guide hole on the upper surface of the repetition lever.

When a front end of the key is pressed down by key depression, the rear end thereof is moved upward. In accordance therewith, the repetition lever of the action unit is moved upward and pushes up the hammer via the protrusion to thereby pivotally move the hammer upward. Further, from partway through the upward movement of the repetition lever, the hammer push-up portion of the jack pushes up the hammer via the protrusion, and pivotally moves the hammer further upward. Then, when partway through pushing up of the hammer by the jack, the jack is latched by the jack latching means, whereby the hammer push-up portion of the jack is disengaged from the protrusion of the hammer, in other words, the jack is caused to escape from the hammer. Such escapement of the jack releases the hammer from connection with the action unit and the key, and the hammer pivotally is moved upward in a free rotation state. During this escapement of the jack, a click feeling is generated by a sharp increase and decrease in the touch weight of the key, whereby a let-off feeling is added to a key touch feeling sensed by a player who depresses the key.

When the depressed key is partway through returning to the key-released state, the jack returning means returns the hammer push-up portion of the jack disengaged from the protrusion of the hammer to its position before disengagement. With this, the hammer push-up portion of the jack turns around into a position under the protrusion of the hammer, which consequently makes it possible for the action unit to drive the hammer even when the key does not completely return to its key-released position.

As described above, by employing the keyboard device including the key, action unit, and hammer constructed as described above, it is possible to realize the same operation as performed by the grand piano, whereby it is possible to obtain the same key touch feeling and performability as provided by the grand piano during musical performance.

Preferably, the holder is formed as a molded article made of a synthetic resin, and the holder includes a key mounting portion fixed to the key, a repetition support shaft and a jack support shaft provided at respective predetermined locations rearward of the key mounting portion in a laterally protruding state, for pivotally supporting the repetition lever and the jack, respectively, the repetition lever being formed as a molded article made of a synthetic resin and including a repetition fitting hole for being pivotally fitted on the repetition support shaft, and the jack being formed as a molded article made of a synthetic resin and including a jack fitting hole for being pivotally fitted on the jack support shaft.

With the construction of this preferred embodiment, the holder, the repetition lever, and the jack, which form the action unit, are each formed as a molded article made of a synthetic resin. The holder is fixed to the key via the key mounting portion and includes the repetition support shaft and the jack support shaft which are provided at the respective predetermined locations rearward of the key mounting portion in the laterally protruding state. Further, the repetition lever and the jack include the repetition fitting hole and the jack fitting hole, respectively, and simply by fitting the repetition support shaft and the jack support shaft of the holder in these fitting holes, it is possible to pivotally mount the repetition lever and the jack to the holder with ease.

As described above, in the action unit of the keyboard device of the present invention, it is possible to reduce the number of components and the number of the adjustment portions, compared with the action of the grand piano, whereby it is possible to improve productivity and maintainability.

More preferably, the jack includes a rear arm extending rearward from about the jack fitting hole, and the jack latching means includes a jack stopper which is provided on the hammer support, for latching the jack by having the rear arm brought into contact therewith from below during key depression.

With the construction of this preferred embodiment, the jack includes the rear arm extending rearward from about the jack fitting hole, and the rear arm is brought into contact with the jack stopper of the hammer support from below, whereby the jack is latched with the jack stopper. As described above, the jack stopper as the jack latching means for latching the jack is provided in the hammer support, whereby it is possible to relatively easily form the jack latching means for disengaging the hammer push-up portion of the jack from the protrusion of the hammer.

Further preferably, the jack includes a front arm extending forward from about the jack fitting hole, and the jack returning means is formed by a spring for urging the front arm downward.

With the construction of this preferred embodiment, the jack includes the front arm extending forward from about the jack fitting hole, and the front arm is urged downward by the spring, whereby the hammer push-up portion of the jack is returned to the position before disengagement. Thus, the jack returning means for returning the hammer push-up portion of the jack to the position before disengagement is formed by the spring, whereby it is possible to relatively easily form the jack returning means.

Preferably, the hammer support includes a hammer stopper into which the hammer is brought into contact when the hammer is pivotally moved upward during key depression, for blocking further pivotal movement of the hammer, the hammer including a back check engagement portion protruding downward from a predetermined location of a bottom surface of the hammer, and the holder including a back check which stops the hammer by being engaged with the back check engagement portion when the hammer, which has pivotally moved upward during key depression and has contacted the hammer stopper, rebounds from the hammer stopper and pivotally moves downward.

With the construction of this preferred embodiment, the hammer, which has pivotally moved upward during key depression and has contacted the hammer stopper, rebounds from the hammer stopper and pivotally moves downward. In this case, the back check engagement portion protruding downward from the predetermined location of the bottom surface of the hammer is engaged with the back check of the holder. In this case, the hammer is engaged with the back check via the back check engagement portion, whereby further downward pivotal movement of the hammer is blocked to stop the hammer, so that it is possible to prevent occurrence of rebound or vibration of the hammer. Further, in this case, load due to the above-mentioned rebound of the hammer is transmitted to the key. As a consequence, the player having depressed the key can definitely feel a stop feeling of the key to be obtained at the time of full depression thereof.

The above and other objects, features, and advantages of the present invention will become more apparent from the following detailed description taken in conjunction with the accompanying drawings.

BRIEF DESCRIPTION OF THE DRAWINGS

FIGS. 1A and 1B are views of a part of a keyboard device of an electronic piano to which is applied a keyboard device according to an embodiment of the present invention, in which FIG. 1A is a perspective view and FIG. 1B is a right side view;

FIGS. 3A and 3B are perspective views of a hammer support, in which FIG. 3A is a perspective view of the appearance of the hammer support and FIG. 3B is a view of the hammer support in a partially cut-out state;

FIGS. 4A and 4B are views of the hammer support, in which FIG. 4A is a front view and FIG. 4B is a cross-sectional view taken along line A-A of FIG. 4A;

FIGS. 5A and 5B are enlarged perspective views of the hammer and the action unit, in which FIG. 5A shows the components of the action unit in a combined state and FIG. 5B shows the components of the action unit in an exploded state;

FIGS. 10A and 10B are explanatory views useful in sequentially explaining a sequence of movements of the action unit and the hammer during key depression, in which FIG. 10A shows a key-released state and FIG. 10B shows a state in which the repetition lever is brought into contact with a repetition stopper during key depression;

FIGS. 11A and 11B are explanatory views continued from FIGS. 10A and 10B, in which FIG. 11A shows a state in which the jack is brought into contact with a jack stopper and FIG. 11B shows a state in which the jack is disengaged from a hammer protrusion;

FIGS. 12A and 12B are explanatory views continued from FIGS. 11A and 11B, in which FIG. 12A shows a state in which the hammer is brought into contact with a hammer stopper and FIG. 12B shows a state in which the hammer rebounded from the hammer stopper is brought into contact with a back check; and FIGS. 13A and 13B are explanatory views continued from FIGS. 12A and 12B, in which FIG. 13A shows a state in which the jack has turned around into a position under a hammer protrusion due to a slight return of a key depressed, and FIG. 13B shows a state in which the key has returned to its original key-released state.

DETAILED DESCRIPTION OF PREFERRED EMBODIMENTS

Figure 1A:
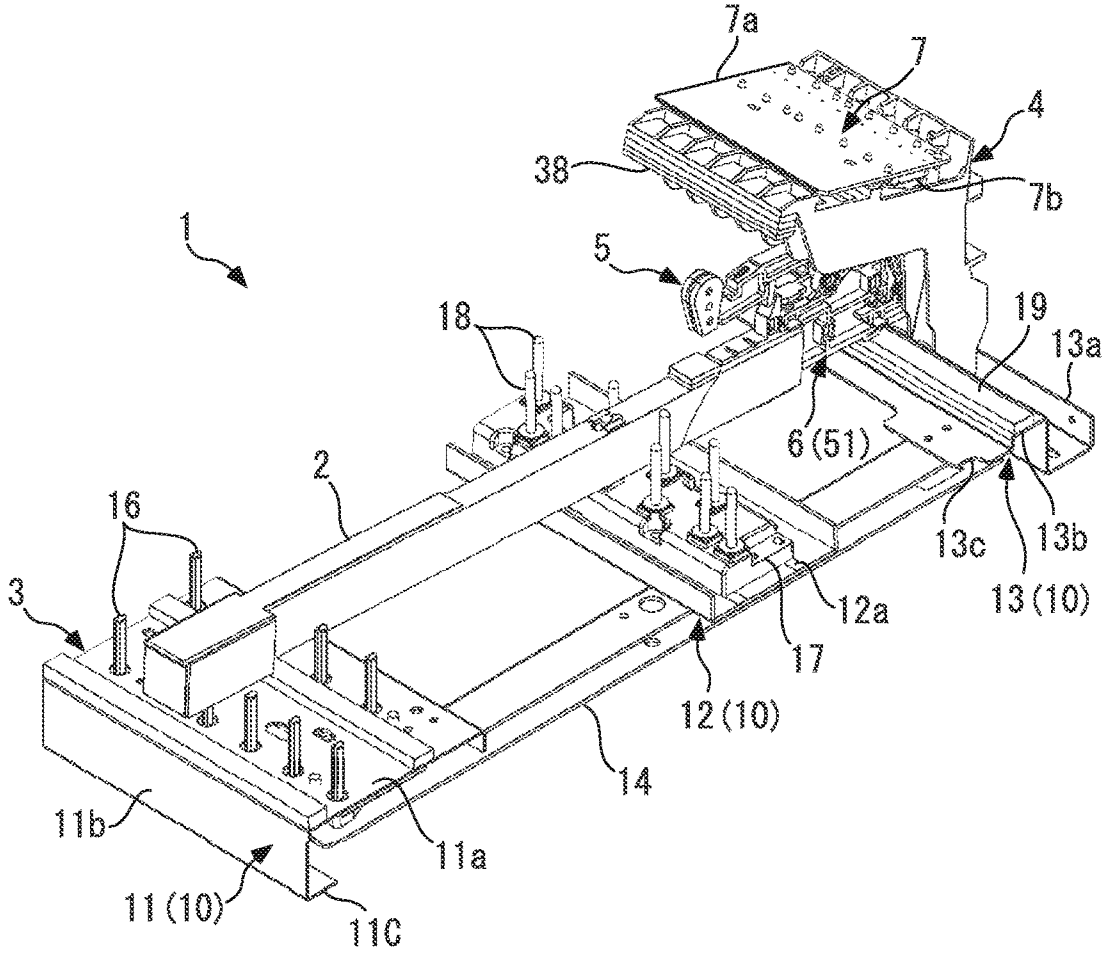
Figure 1B:
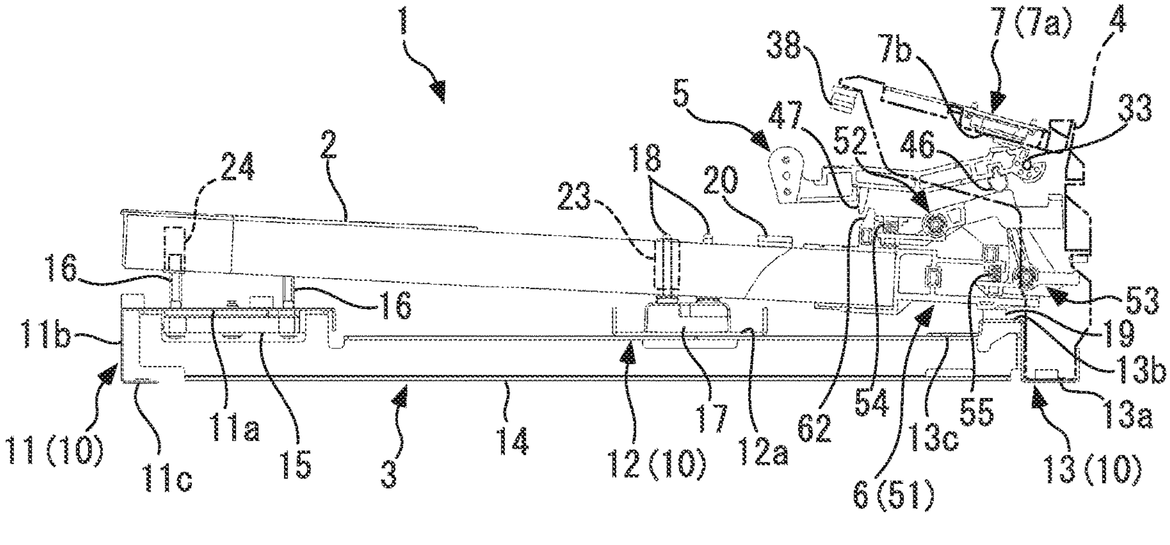

The present invention will now be described in detail with reference to the drawings showing preferred embodiments thereof. FIGS. 1A and 1B are views showing a part of a keyboard device, in a key-released state, of an electronic piano to which is applied a keyboard device according to an embodiment of the present invention. FIG. 1A is a perspective view and FIG. 1B is a right side view.

As shown in FIGS. 1A and 1B, the keyboard device 1 includes a plurality of keys 2 (only one white key is shown in FIGS. 1A and 1B) arranged side by side in a left-right direction of the electronic piano, a keyboard chassis 3 supporting the keys 2, a hammer support 4 connected to a rear end of the keyboard chassis 3, a hammer 5 provided for each key 2 and pivotally supported by the hammer support 4, an action unit 6 provided on a rear end of the key 2, for driving the hammer 5 upward in accordance with key depression, and a key switch 7 for detecting key depression information of the key 2.

As shown in FIGS. 1A and 1B, the keyboard chassis 3 is formed by assembling, in parallel crosses, three support rails 10, i.e. a front rail 11, a middle rail 12, and a rear rail 13 each extending in the left-right direction and arranged with predetermined distances therebetween in the front-rear direction (in a left-right direction as viewed in FIG. 1B), and a plurality of (e.g. five) reinforcement ribs 14 (only one of which is shown in FIGS. 1A and 1B) each extending in the front-rear direction and arranged with a predetermined distance therebetween in the left-right direction. The support rails 10 and the ribs 14 are made of iron plates formed into respective predetermined shapes e.g. by stamping and bending using a press and are connected to each other by screwing them together.

The front rail 11 includes a horizontally extending top board 11*a*, a front board 11*b* bent downward at right angles from a front end of the top board 11*a*, and a bottom board 11*c* bent rearward at right angles from a lower end of the front board 11*b*. The top board 11*a* has a keyframe front 15 screwed to a lower surface thereof. The keyframe front 15 is formed into the shape of a thick flat plate made of a synthetic resin and extends in the left-right direction along the entirety of the front rail 11. On the keyframe front 15, there are erected a number of front rail pins 16 extending through the top board 11*a* of the front rail 11 at front and rear locations corresponding to the white keys 2 and black keys (not shown), respectively, in a state arranged side by side in the left-right direction.

The middle rail 12 includes a horizontally extending keyframe center-placing portion 12*a*, which has a front end and a rear end thereof bent upward at right angles. A keyframe center 17 is fixed e.g. by screws to the above-mentioned keyframe center-placing portion 12*a* in a state placed thereon. The keyframe center 17 is formed into the shape of a thick flat plate made of a synthetic resin and extends in the left-right direction along the entirety of the middle rail 12. On the keyframe center 17, there are erected a number of balance rail pins 18 at front and rear locations corresponding to the white keys 2 and the black keys, respectively, in a state arranged side by side in the left-right direction.

The rear rail 13 includes an accommodation recess 13*a* open upward and engaged with the hammer support 4 in a state accommodating a lower portion of the hammer support 4, a cushion placing portion 13*b* bent at right angles from an upper end of a front panel of the accommodation recess 13*a* and then horizontally extending forward, with a cushion 19 extending in the left-right direction, mounted in a state placed thereon, and a connecting portion 13*c* extending downward to a position one step lower in height than a front end of the cushion placing portion 13*b* and further extending horizontally forward. The front panel of the accommodation recess 13*a* is formed with a plurality of mounting holes extending through the front panel in the front-rear direction, and via the mounting holes, a lower end of the hammer support 4 is screwed to the rear rail 13. Further, the accommodation recess 13*a* and the connecting portion 13*c* are screwed to a rear end of each associated one of the ribs 14.

Figure 2A:
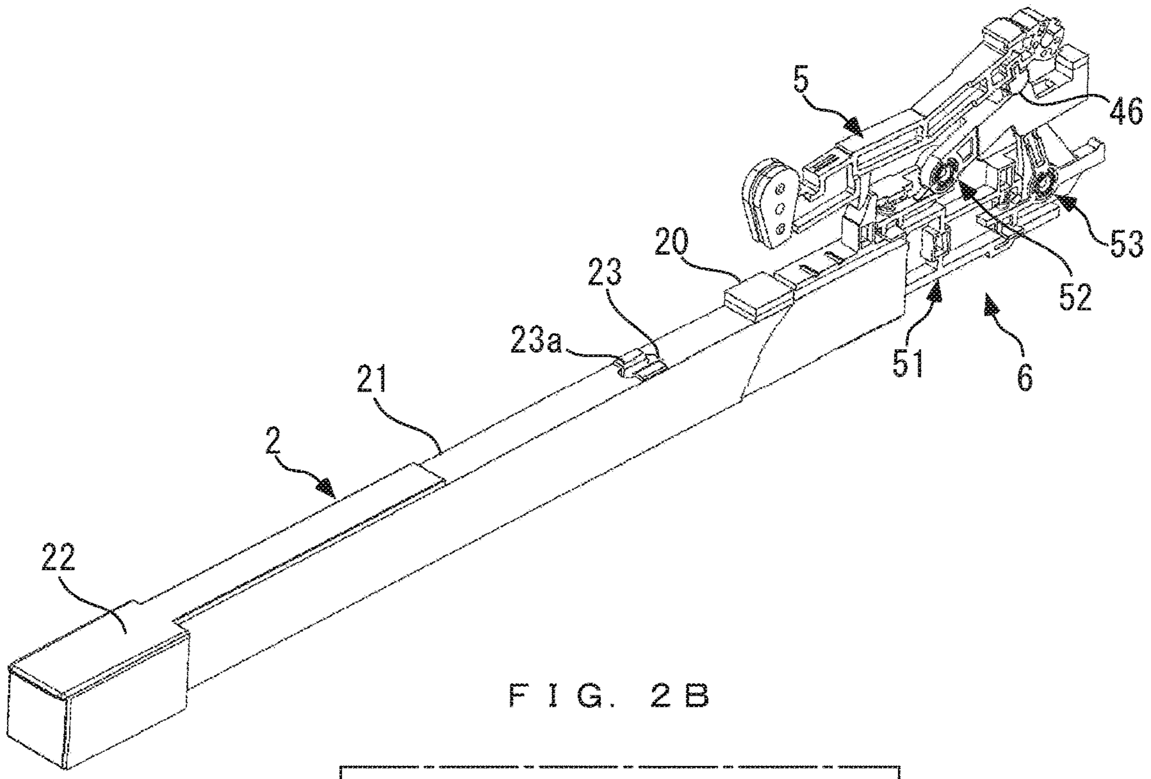
FIG. 2A is a perspective view of an action unit assembled to a key and a hammer placed on the action unit.
Figure 2B:
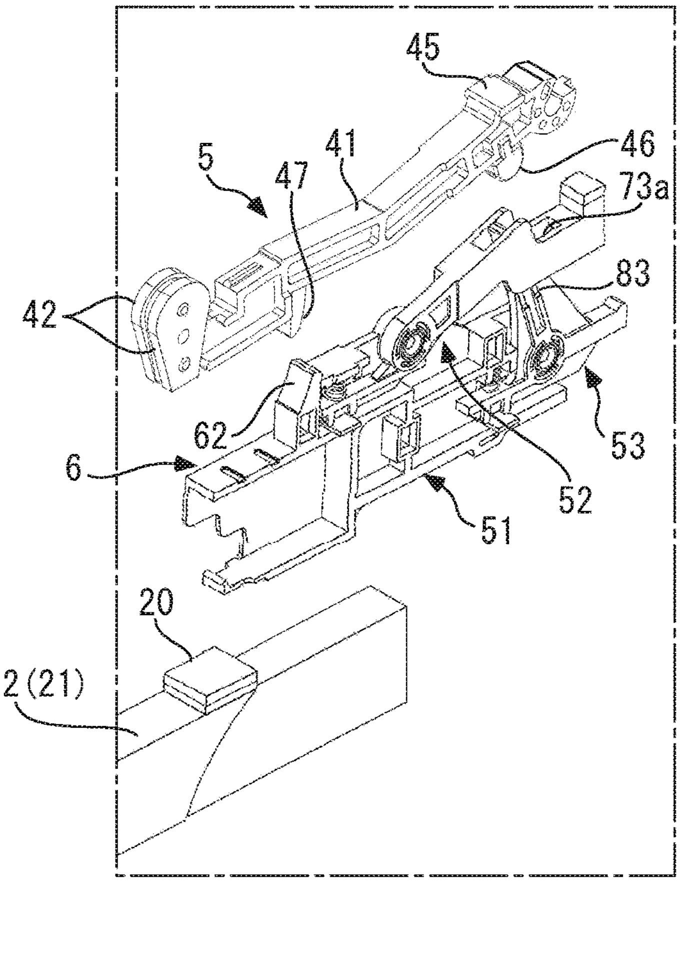
FIG. 2B is an exploded perspective view of the key, the action unit, and the hammer.
Figure 3A:
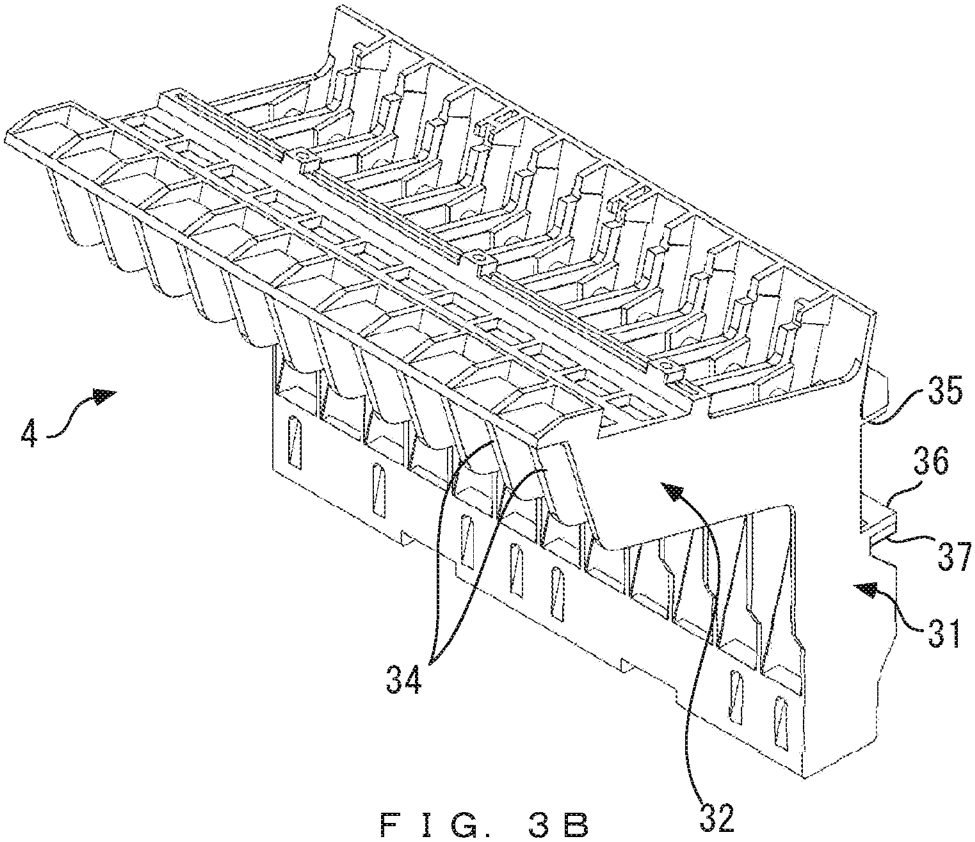
Figure 3B:
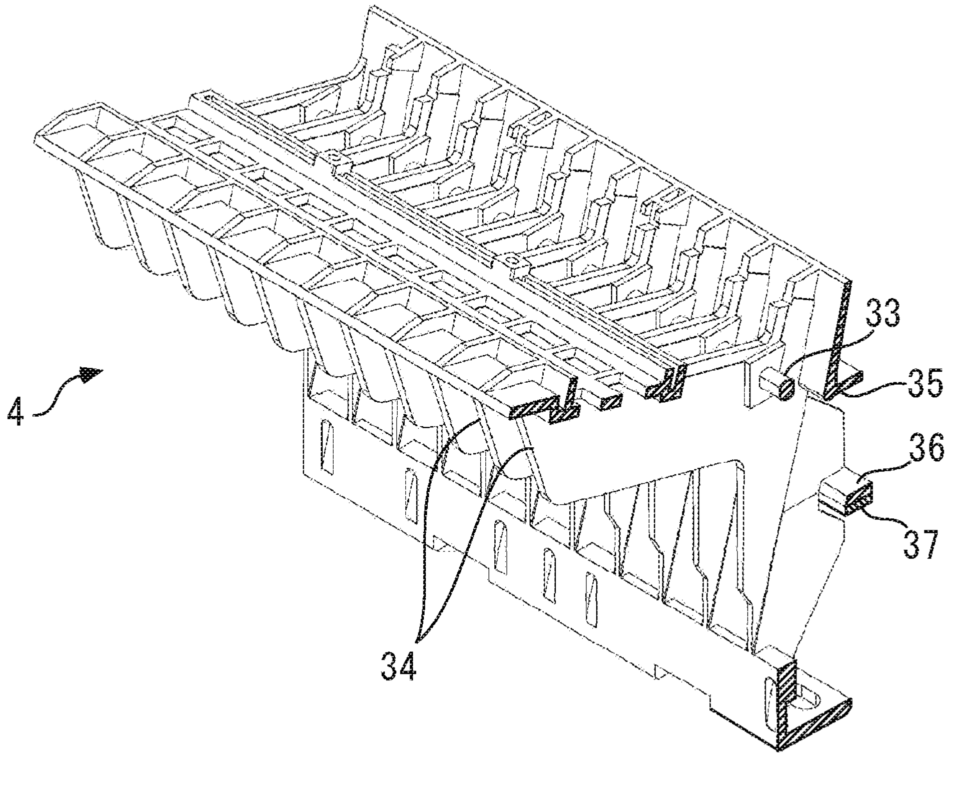

FIG. 2A shows the action unit 6 assembled to each key 2 and a hammer 5 placed on the action unit 6, and FIG. 2B shows the key 2, the action unit 6, and the hammer 5, in an exploded state. As shown in FIGS. 2A and 2B, the key 2 has a wooden key body 21 extending a predetermined length in the front-rear direction and having a rectangular shape in transverse cross section and a key cover 22 made of a synthetic resin and bonded to an upper surface and a front surface of a front half portion of the key body 21. At about the center of the key body 21 in the longitudinal direction thereof, there is formed a balance rail pin hole 23 vertically extending through the key body 21, and the key 2 is swingably supported by an associated one of the balance rail pins 18 erected on the keyframe center 17, via the balance rail pin hole 23.

The above-mentioned balance rail pin hole 23 has a substantially circular hole formed at about a lower surface of the key body 21 and a whole upper portion thereof continuous with the circular hole formed in a slot-like shape extending in the longitudinal direction of the key body 21. Further, on each of the left and right inner surfaces of the balance rail pin hole 23, there is provided a felt 23*a* so as to hold the key 2 in smooth sliding contact with the balance rail pin 18 during its swinging motion. Note that a cushion 20 is bonded to an upper surface of the key body 21 at a location rearward of the balance rail pin hole 23. The cushion 20 is provided so as to prevent a front end of the hammer 5 from directly hitting against the key 2 e.g. during maintenance.

Further, the key body 21 has a front rail pin hole 24 open downward (see FIG. 1B) which is formed at a predetermined location in a front portion thereof, and the front rail pin hole 24 is engaged with an associated one of the front rail pins 16 erected on the keyframe front 15, whereby the key 2 is prevented from laterally swaying during its swinging motion.

FIGS. 3A and 3B and FIGS. 4A and 4B show the hammer support 4. As shown in FIGS. 3A and 3B and FIGS. 4A and 4B, the hammer support 4 is formed as a molded article made of a synthetic resin, and a plurality of molded articles each of the hammer support 4 e.g. for a one-octave section are screwed to the rear rail 13 of the keyboard chassis 3 in a state connected to each other in the left-right direction. The hammer support 4 is comprised of a hammer supporting portion 31 erected in the vicinity of the rear rail 13 and a switch mounting portion 32 extending forward and obliquely upward from an upper end of the hammer supporting portion 31. In the upper end of the hammer supporting portion 31, there are provided hammer support shafts 33 for pivotally supporting the respective hammers 5.

Figure 4A:
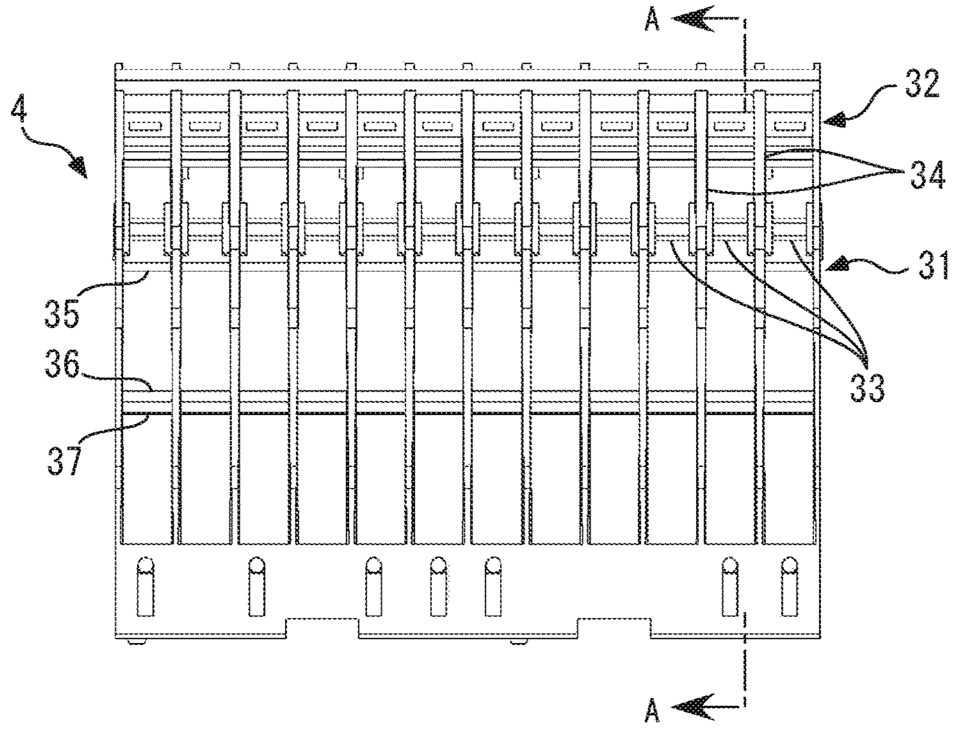
Figure 4B:
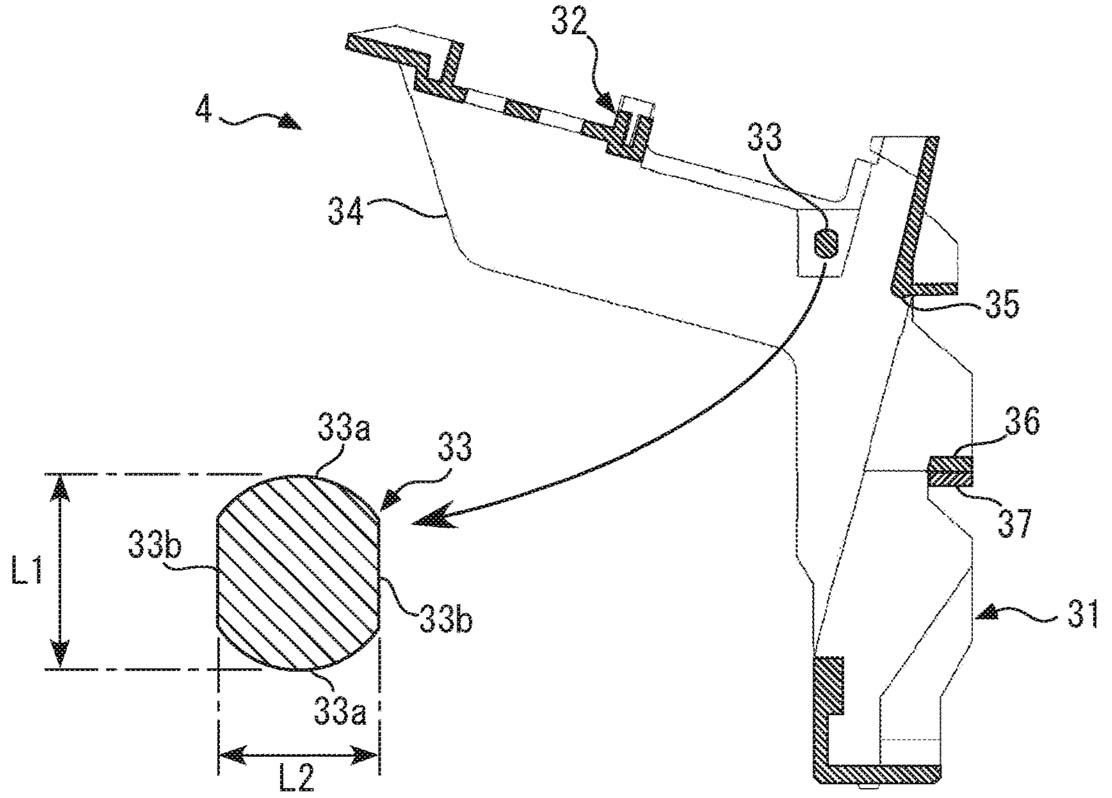

Further, the hammer support 4 has a plurality of partition walls 34 for separating the hammers 5 adjacent to each other, with a predetermined spacing therebetween in the left-right direction, and each of the hammer support shafts 33 extends between each adjacent two of the partition walls 34 and 34 in the left-right direction. As shown in FIG. 4B on an enlarged scale, the hammer support shaft 33 has a cross-sectional shape formed in a so-called oval shape formed by cutting off front and rear portions of a circle the center of which corresponds to the axis of the hammer support shaft 33.

Specifically, the hammer support shaft 33 has an outer peripheral surface formed by a pair of upper and lower curved surfaces 33*a* and 33*a* and a pair of front and rear flat surfaces 33*b* and 33*b* each extending between the curved surfaces 33*a* and 33*a*. In the hammer support shaft 33 formed as above, the upper and lower curved surfaces 33*a* and 33*a* are set as segments of the circle, which has a diameter of a length L1, and the distance between the front and rear flat surfaces 33*b* and 33*b* is set to a length L2 which is shorter than the length L1.

Further, as shown in FIGS. 1A and 1B, the key switches 7 are mounted to the switch mounting portion 32 of the hammer support 4. The key switches 7 are formed by a switch board 7*a* formed by a printed circuit board and switch bodies 7*b* each formed by a rubber switch and provided on the switch board 7*a* on a side toward an associated one of the hammers 5 on a key-by-key basis.

Further, as shown in FIGS. 3A and 3B and FIGS. 4A and 4B, on a rear surface of the hammer support 4, at a location obliquely rearward and downward of the hammer support shaft 33, there is provided a repetition stopper 35 with which a repetition lever 52, described hereinafter, of the action unit 6 is brought into contact during key depression, to be latched thereby. Further, on the rear surface of the hammer support 4, at a location downward of the repetition stopper 35, there is provided a jack stopper 36 (jack latching means) with which a jack 53, described hereinafter, of the action unit 6 is brought into contact during key depression, to be latched thereby. Note that a cushion 37 extending in the left-right direction is attached to a lower surface of the jack stopper 36.

Further, as shown in FIGS. 1A and 1B, on an upper portion of a front end of the hammer support 4, there is provided a hammer stopper 38 with which, when an associated one of the hammers 5 is pivotally moved upward, the hammer 5 is brought into contact from below, thereby blocking further pivotal movement of the hammer 5.

Figure 5A:
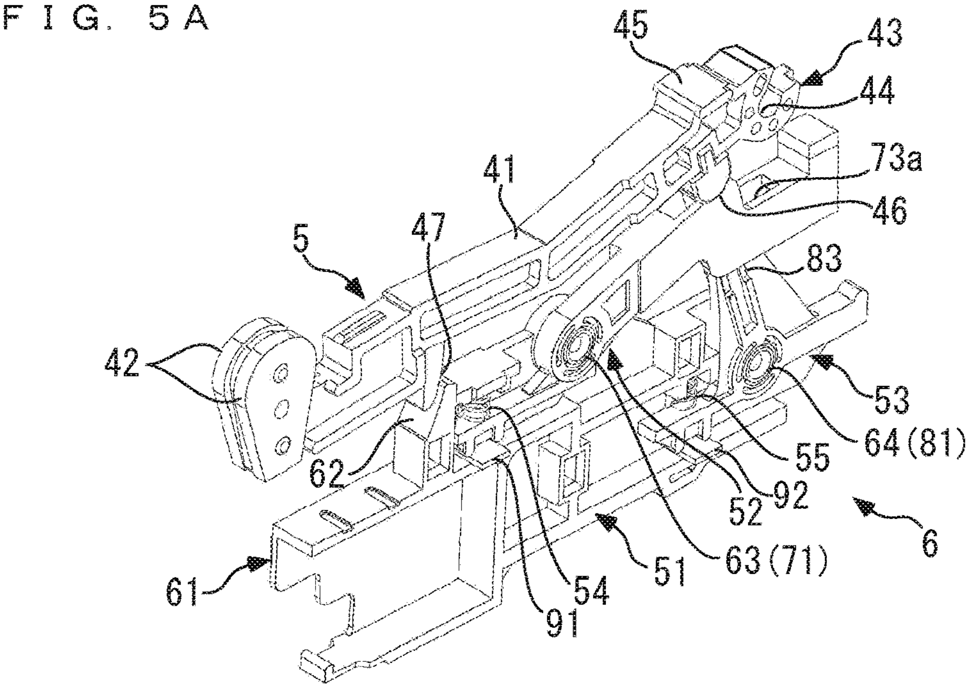
Figure 5B:
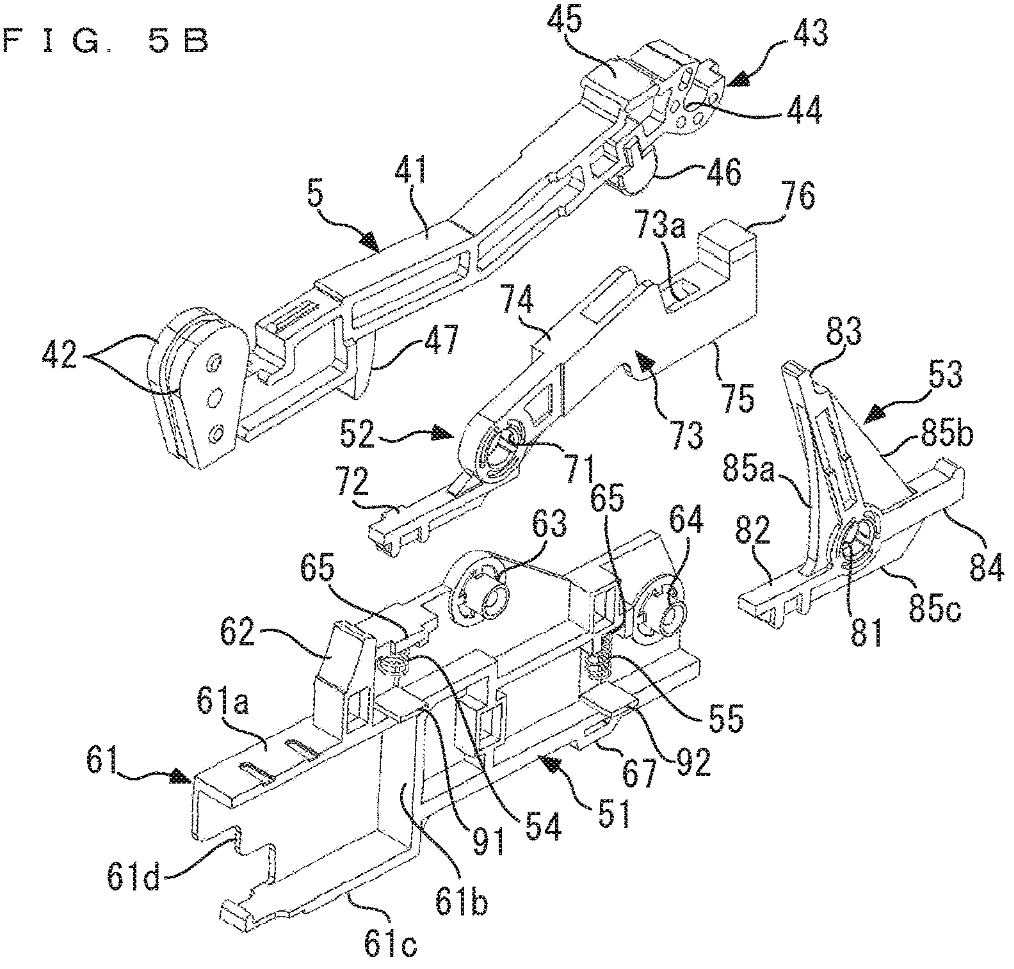
Figure 6:
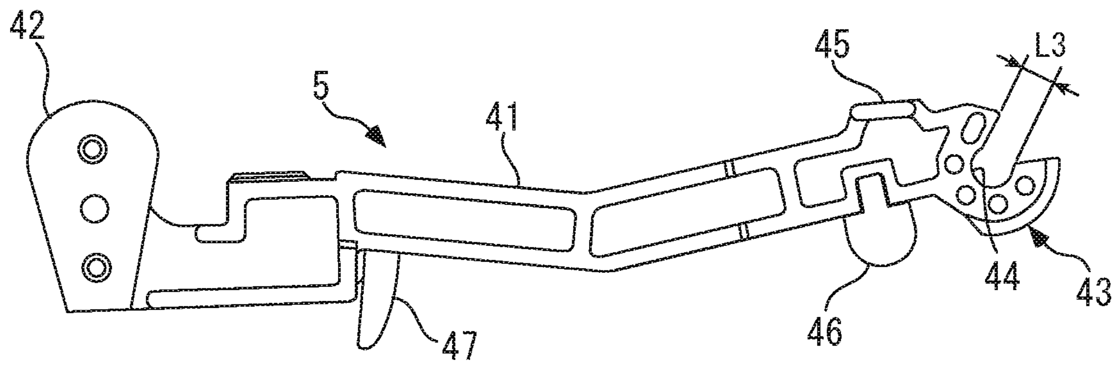
FIG. 6 is a right side view of the hammer.

FIGS. 5A and 5B show the hammer 5 and the action unit 6. FIG. 5A shows the components of the action unit in a combined state and FIG. 5B shows the components of the action unit in an exploded state. Further, FIG. 6 is a right side view of the hammer 5. As shown in FIGS. 5A and 5B and FIG. 6, the hammer 5 is comprised of an arm-like hammer body 41 extending in the front-rear direction and two weight plates 42 and 42 mounted to the front ends of the respective left and right side surfaces of the hammer body 41. The hammer body 41 is made of a synthetic resin, and each of the weight plates 42 is made of a metal material, such as steel, having a relatively large specific gravity.

The hammer body 41 has a rear end formed with an engagement portion 43 for engagement with the hammer support shaft 33 of the hammer support 4. The engagement portion 43 has an arcuate shaft hole 44 extending therethrough in the left-right direction and formed in a C shape in side view, and the opening of the shaft hole 44 is formed to expand outward. The shaft hole 44 has a diameter which is slightly larger than the diameter (length L1) of the circle defined by the upper and lower curved surfaces 33*a* and 33*a* of the hammer support shaft 33, and the opening has a width L3 which is slightly larger than the length L2 between the front and rear flat surfaces 33*b* and 33*b* of the hammer support shaft 33 and smaller than the length L1. The hammer 5 can be mounted/removed to/from the hammer support shaft 33 of the hammer support 4 via the opening of the shaft hole 44, and the shaft hole 44 is engaged with the hammer support shaft 33, whereby the hammer 5 is pivotally supported by the hammer support 4.

Further, a switch pressing portion 45 and a hammer protrusion 46 (protrusion) are formed at respective upper and lower locations of a rear portion of the hammer 5 immediately forward of the shaft hole 44. The switch pressing portion 45 has an upper surface formed flat, and when the hammer 5 is pivotally moved upward, the hammer 5 presses an associated one of the switch bodies 7*b* of the key switches 7, whereby key depression information of one of the keys 2 associated with the hammer 5 is detected. On the other hand, the hammer protrusion 46 protrudes downward and has a lower surface thereof formed in an arcuate shape. With this, in the key-released state, the hammer protrusion 46 is placed on a hammer placing portion 74 of the repetition lever 52, described hereinafter, of the action unit 6.

Furthermore, at a predetermined location of a front portion of the hammer 5, there is formed a back check engagement portion 47 which protrudes downward and is capable of being engaged with a back check 62, described hereinafter, of the action unit 6. As shown in FIG. 6, the back check engagement portion 47 has an elongated shape in side view with a front surface thereof formed flat and a rear surface thereof gently curved.

Next, a description will be given of the action unit 6. As shown in FIGS. 5A and 5B, the action unit 6 is comprised of a holder 51 fixed to a rear end of the key 2, the repetition lever 52 and the jack 53 which are pivotally mounted on the holder 51, and a repetition spring 54 and a jack spring 55 (jack returning means), both of which are formed by coil springs, for urging the repetition lever 52 and the jack 53 so as to pivotally move them in respective predetermined directions.

Figure 7:
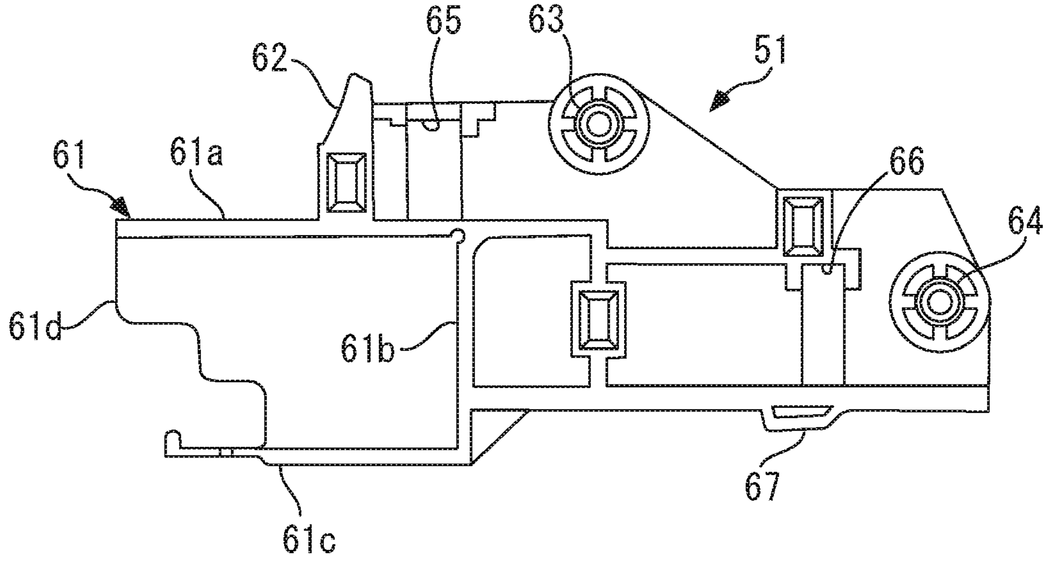
FIG. 7 is a right side view of a holder.

FIG. 7 is a right side view of the holder 51. As shown in FIG. 7 and FIGS. 5A and 5B, the holder 51 is formed as a molded article made of a synthetic resin and having a predetermined shape formed to extend in the front-rear direction. The holder 51 is comprised of a key mounting portion 61 formed at a front portion of the holder 51 and fixed to the rear end of the key 2, the back check 62 formed in an upper portion of the key mounting portion 61, a repetition support shaft 63 provided at an upper end of the holder 51 at about the center thereof in the front-rear direction, for pivotally supporting the repetition lever 52, and a jack support shaft 64 provided at a rear end of the holder 51, for pivotally supporting the jack 53.

The key mounting portion 61 is formed by an upper wall 61*a*, a rear wall 61*b*, and a lower wall 61 into an inverted C shape in side view, and left ends of the walls 61*a*, 61*b*, and 61*c* are continuous to a left-side wall 61*d*. Therefore, when the holder 51 is mounted to the rear end of the key 2, the upper wall 61*a*, the rear wall 61*b*, the lower wall 61*c*, and the left-side wall 61*d* are brought into contact with an upper surface, a rear surface, a lower surface and a left-side surface of the rear end of the key 2, and are firmly fixed thereto in this state by bonding.

The back check 62 has a predetermined length in the vertical direction and is formed into a gentle arcuate shape facing forward and obliquely upward.

The repetition support shaft 63 and the jack support shaft 64 are both formed into a hollow cylindrical shape protruding rightward by a predetermined length and having a predetermined diameter. Further, the repetition support shaft 63 is formed at a predetermined location higher than the jack support shaft 64.

Further, on the holder 51, there is formed a repetition spring engagement portion 65 for latching an upper end of the repetition spring 54 at a predetermined location forward of the repetition support shaft 63 between the back check 62 and the repetition support shaft 63. Furthermore, the holder 51 includes a jack spring engagement portion 66 for engagement with an upper end of the jack spring 55, which is formed at a predetermined location forward of the jack support shaft 64 between the repetition support shaft 63 and the jack support shaft 64. Further, the holder 51 has a protrusion 67 formed at a rear end of a lower surface thereof such that the protrusion 67 protrudes slightly downward. In the key-released state, the holder 51 is placed on the cushion 19 on the rear rail 13 via the protrusion 67.

Figure 8:
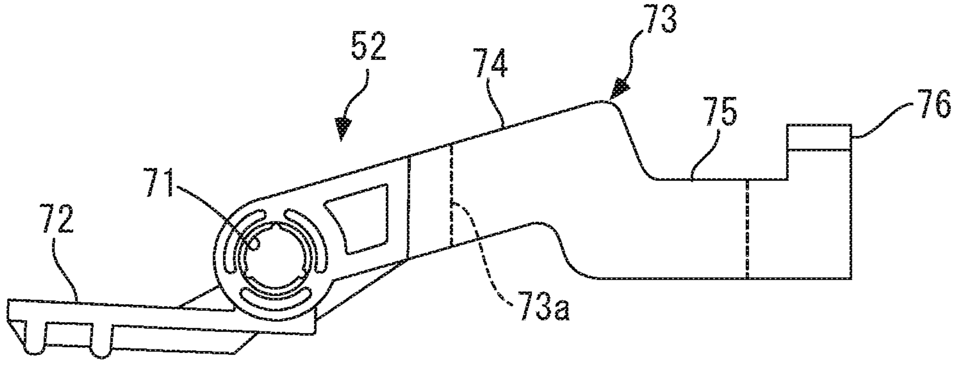
FIG. 8 is a right side view of a repetition lever.

FIG. 8 is a right side view of the repetition lever 52. As shown in FIG. 8 and FIGS. 5A and 5B, the repetition lever 52 is formed as a molded article made of a synthetic resin and having a predetermined shape formed to extend in the front-rear direction. The repetition lever 52 is comprised of a fitting hole 71 (repetition fitting hole) extending through the repetition lever 52 in the left-right direction, for having the repetition support shaft 63 of the holder 51 pivotally fitted therein, a front arm 72 extending forward from about the fitting hole 71, and a hammer placing arm 73 formed to extend rearward from about the fitting hole 71 for having the hammer 5 placed thereon and having the jack 53 engaged therewith.

The hammer placing arm 73 of the repetition lever 52 is comprised of the hammer placing portion 74 which is formed into a shape extending rearward and obliquely upward from the fitting hole 71 by a predetermined length in side view, and an extension portion 75 which extends rearward and obliquely downward from a rear end of the hammer placing portion 74 and then further extends rearward. Further, the hammer placing arm 73 is formed with a jack guide hole 73*a* which vertically extends through the hammer placing arm 73 and extends over the hammer placing portion 74 to the extension portion 75 in the front-rear direction. Note that a rear end of the extension portion 75 is formed to protrude slightly upward, and a cushion 76 is mounted to an upper surface thereof.

Figure 9:
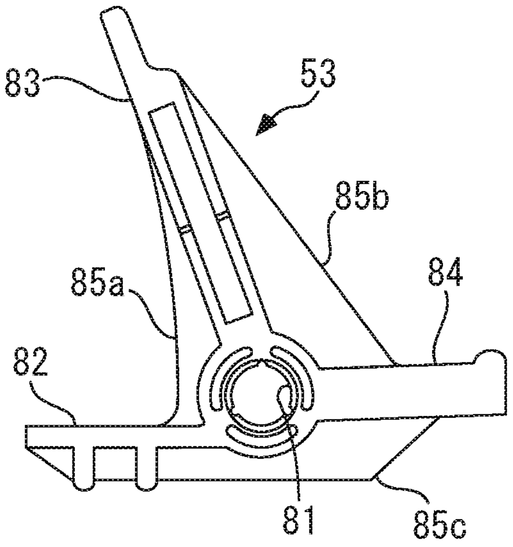
FIG. 9 is a right side view of a jack.

FIG. 9 is a right side view of the jack 53. As shown in FIG. 9 and FIGS. 5A and 5B, the jack 53 is formed as a molded article made of a synthetic resin and having a predetermined shape. The jack 53 is comprised of a fitting hole 81 (jack fitting hole) which extends through the jack 53 in the left-right direction, for having the jack support shaft 64 of the holder 51 pivotally fitted therein, a front arm 82 extending forward from about the fitting hole 81, a hammer push-up portion 83 extending upward from about the fitting hole 81 by a predetermined length, and a rear arm 84 extending rearward from about the fitting hole 81.

The hammer push-up portion 83 extends forward and obliquely upward in a state inclined forward through a predetermined angle with respect to the front arm 82 and the rear arm 84 both extending substantially horizontally in the front-rear direction. Further, an upper end of the hammer push-up portion 83 is formed to have a width in the front-rear direction smaller than a portion of the hammer push-up portion 83 lower than the upper end. Further, the rear arm 84 is formed such that a rear end thereof protrudes slightly upward.

Further, in the jack 53, there are provided plate-like reinforcement ribs 85*a*, 85*b*, and 85*c* between the front arm 82 and the hammer push-up portion 83, between the hammer push-up portion 83 and the rear arm 84, and between the rear arm 84 and the front arm 82, respectively. The strength of the jack 53 is enhanced by these reinforcement ribs 85*a* to 85*c*.

In the action unit 6 formed as described above, as shown in FIG. 5A, the hammer push-up portion 83 of the jack 53 is engaged with the jack guide hole 73*a* of the repetition lever 52 in a state inserted into the jack guide hole 73*a* from below. Further, as shown in FIG. 5A, the repetition lever 52 has the front arm 72 thereof urged downward by the repetition spring 54, whereas the jack 53 has the front arm 82 thereof urged downward by the jack spring 55. With this, the repetition lever 52 and the jack 53 are urged about the repetition support shaft 63 and the jack support shaft 64 in a counterclockwise direction as viewed in FIG. 5A, respectively. Note that the holder 51 of the action unit 6 has thin plate-like cushions 91 and 92 attached thereto at respective locations below the front arm 72 of the repetition lever 52 and below the front arm 82 of the jack 53.

Next, the operation of the action unit 6 and the hammer 5 at the time of depression of the key 2 will be described with reference to FIGS. 10A and 10B to FIGS. 13A and 13B.

Figure 10A:
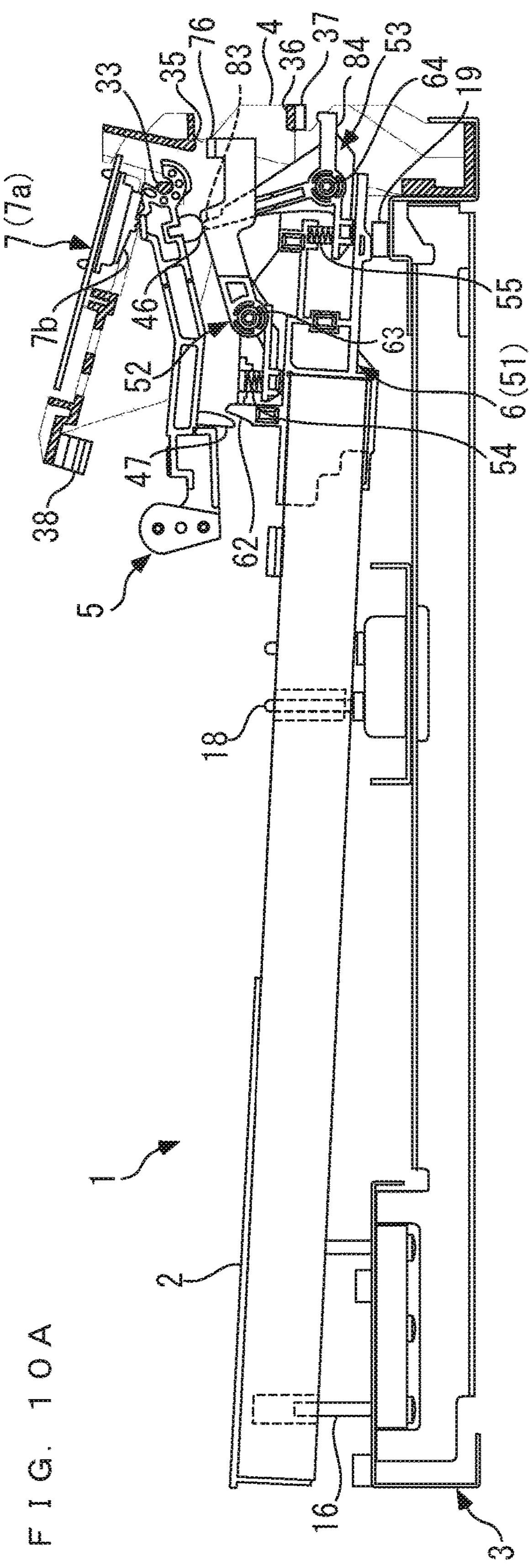

FIG. 10A shows the keyboard device 1 in the key-released state. In this key-released state, the hammer 5 is placed on the hammer placing portion 74 of the repetition lever 52 via the hammer protrusion 46 such that the upper end of the hammer push-up portion 83 of the jack 53 is opposed to the hammer protrusion 46 with a gap. Further, in the key-released state, there is formed a gap between the back check engagement portion 47 of the hammer 5 and the back check 62 of the holder 51.

When a front end of the key 2 is pressed down from the above-described key-released state, the key 2 has its front end swung downward about the associated one of the balance rail pins 18 and its rear end moved upward. In accordance with this upward movement of the rear end of the key 2, the action unit 6 as well is moved upward in unison with the rear end of the key 2, so that the hammer 5 is pushed up by the repetition lever 52 via the hammer protrusion 46. With this, the hammer 5 is pivotally moved upward (in a clockwise direction as viewed in FIGS. 10A and 10B) about the hammer support shaft 33.

Figure 10B:
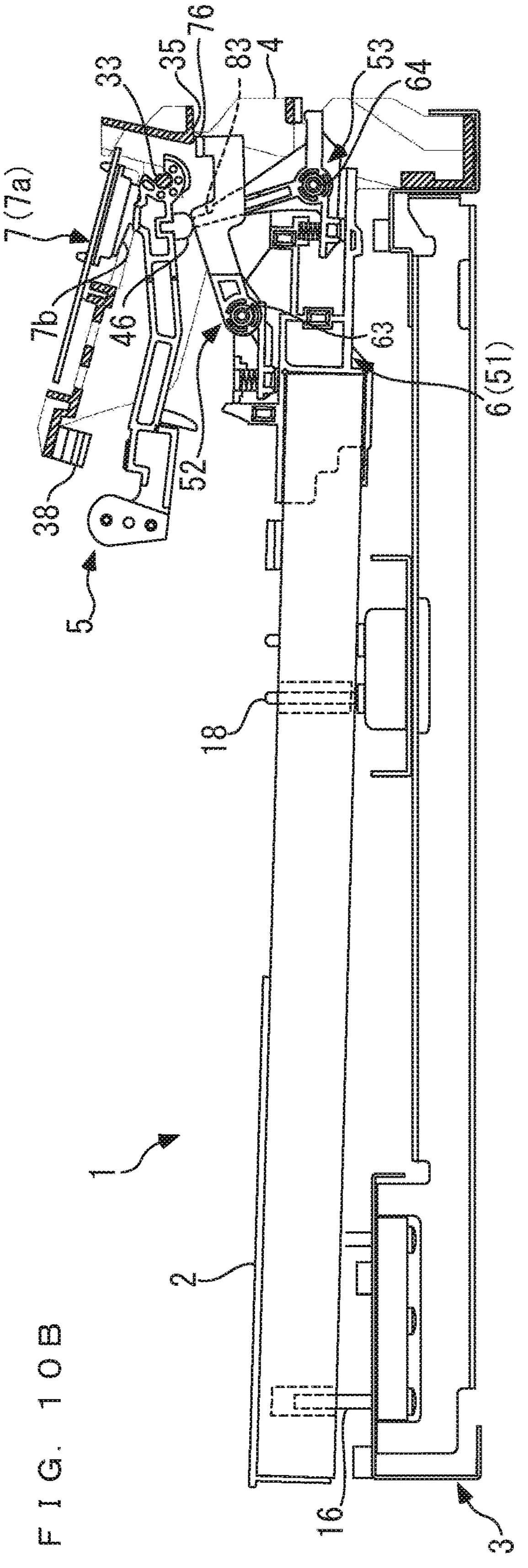

Then, when the key 2 is further depressed to move the action unit 6 further upward, as shown in FIG. 10B, a rear end of the repetition lever 52 is brought into contact with the repetition stopper 35 of the hammer support 4 from below via the cushion 76. With this, the repetition lever 52 is brought into a state in which the rear end thereof is latched, whereas the jack 53 has the upper end of the hammer push-up portion 83 thereof brought into contact with the hammer protrusion 46 from below. This causes the hammer 5 to be pushed up by the hammer push-up portion 83 of the jack 53, thereby being further pivotally moved upward.

Figure 11A:
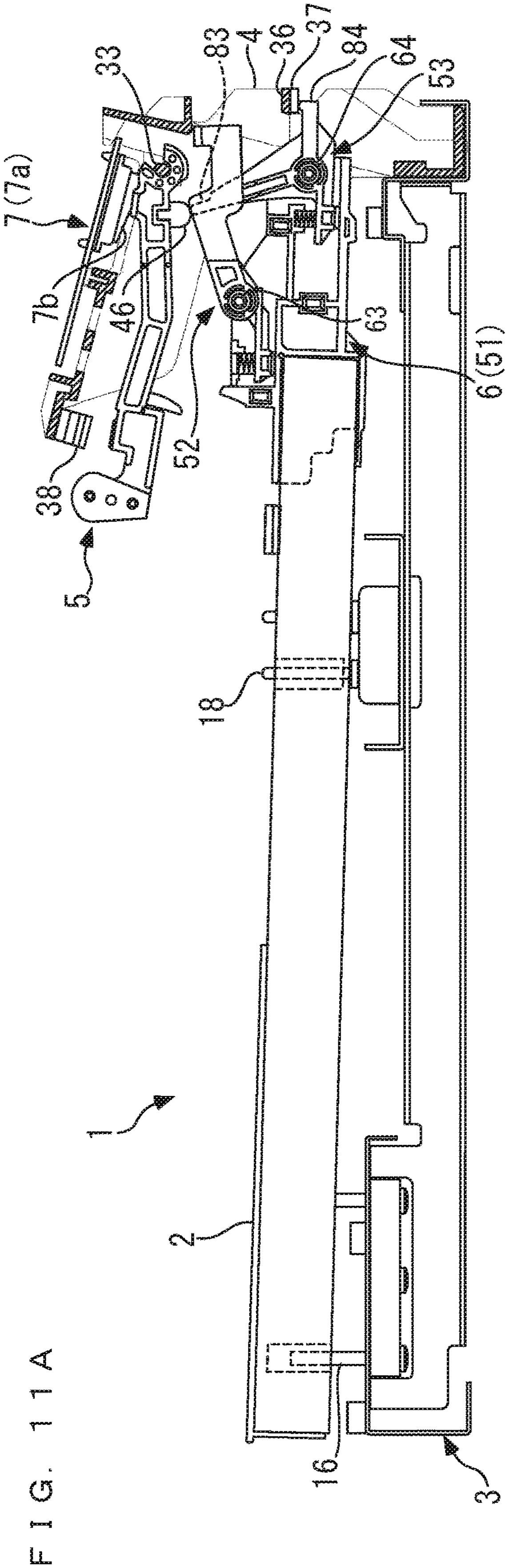
Figure 11B:
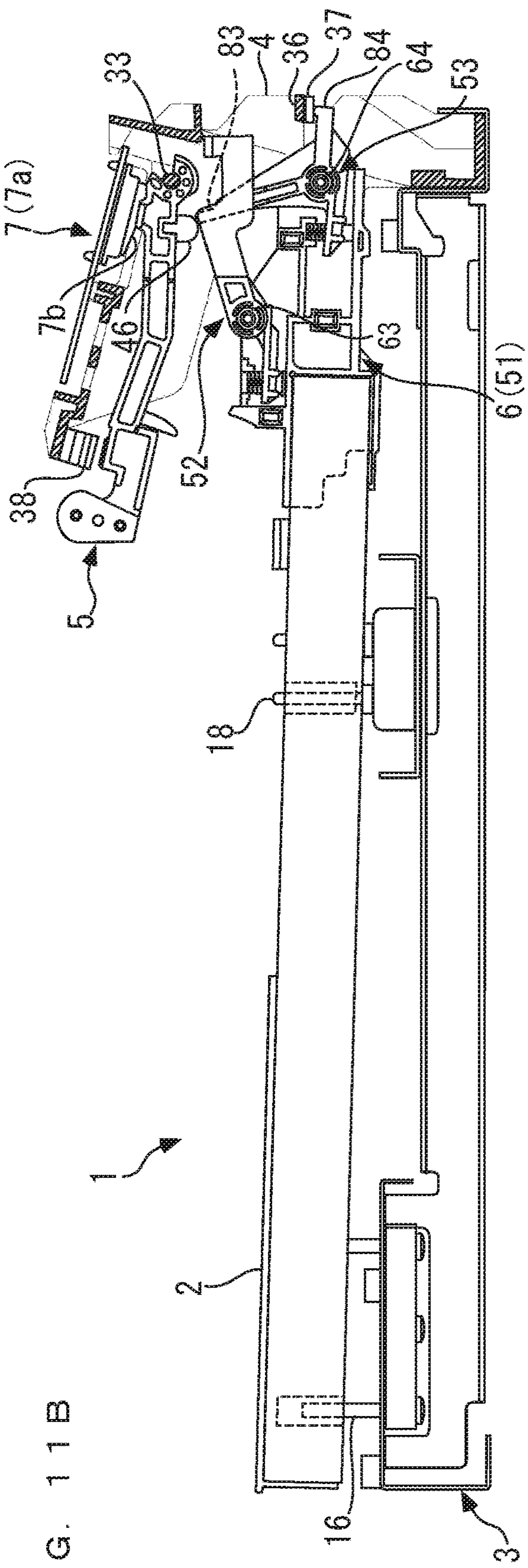

Then, when the key 2 is further depressed to move the action unit 6 further upward, as shown in FIG. 11A, a rear end of the rear arm 84 of the jack 53 is brought into contact with the jack stopper 36 (the cushion 37) from below. This causes the jack support shaft 64 to move upward in a state having the rear end of the rear arm 84 latched on the jack stopper 36, whereby the jack 53 is pivotally moved in a clockwise direction as viewed in FIG. 11A about the jack support shaft 64. As a consequent, as shown in FIG. 11B, an upper end of the hammer push-up portion 83 of the jack 53 is moved rearward, whereby the hammer push-up portion 83 is disengaged from the hammer protrusion 46 of the hammer 5. Such escapement of the jack 53 releases the hammer 5 from connection with the action unit 6 and the key 2, so that the hammer 5 pivotally moves further upward in a free rotation state.

Note that during the escapement of the jack 53, a click feeling is generated by the sharp increase and decrease in the touch weight of the key 2, whereby a let-off feeling is added to a key touch feeling sensed by a performer who depresses the key 2.

Figure 12A:
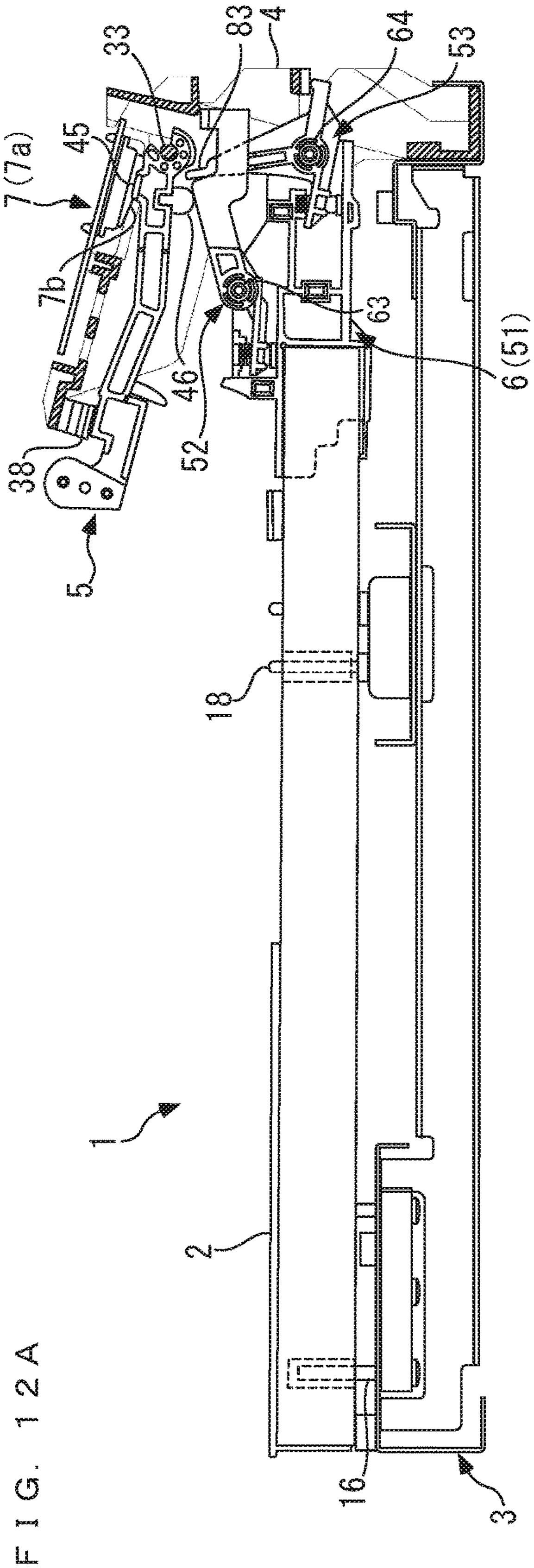

FIG. 12A shows a state in which the hammer 5 pivotally moved upward is in contact with the hammer stopper 38 formed on the upper portion of the front end of the hammer support 4. In this case, a front portion of the hammer body 41 of the hammer 5 is brought into contact with the hammer stopper 38 from below, whereby further pivotal movement of the hammer 5 is blocked. Further, in this case, the switch pressing portion 45 of the hammer 5 presses the switch body 7*b* of the key switch 7 from below to thereby turn on the key switch 7, whereby key depression information of the key 2 corresponding to a pivoting speed and the like of the hammer 5 is detected and output to a tone generation controller (not shown). The tone generation controller outputs a piano tone from a speaker (not shown) of the electronic piano according to the key depression information.

Figure 12B:
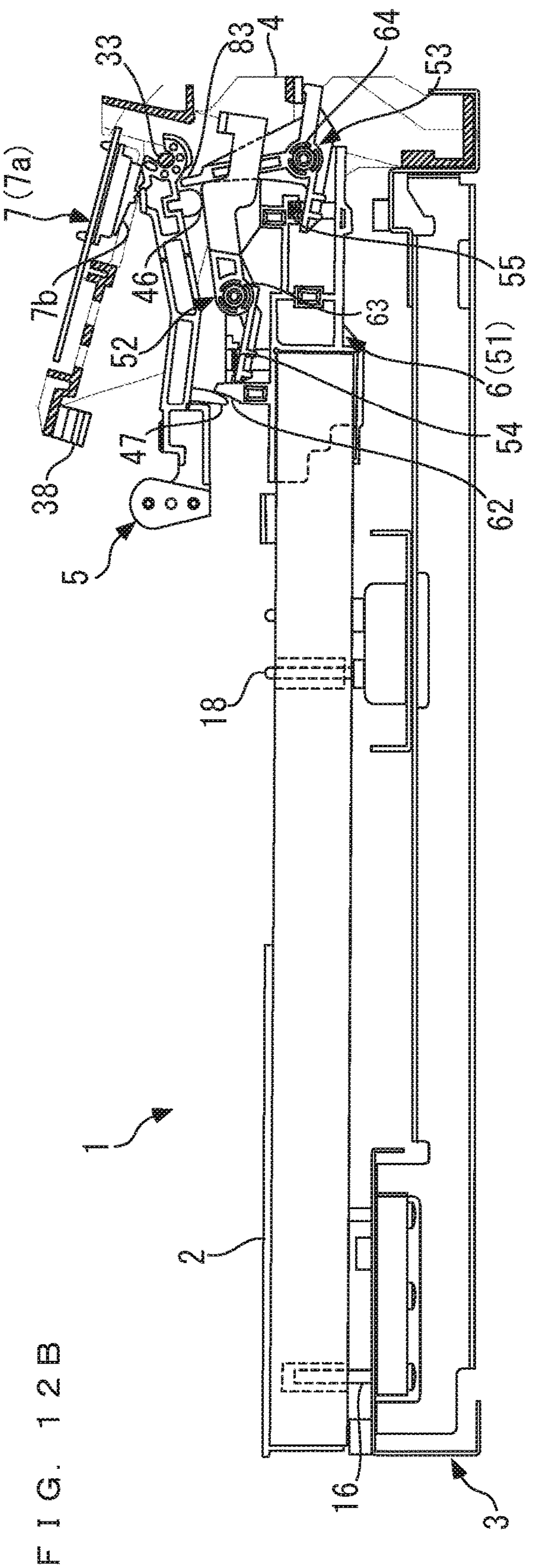

FIG. 12B shows a state immediately after the hammer 5 is brought into contact with the hammer stopper 38, specifically, a state in which the hammer 5 rebounded from the hammer stopper 38 has pivotally moved downward (in the counterclockwise direction), causing the back check engagement portion 47 of the hammer 5 to move into contact with the back check 62 of the holder 51. In this case, the hammer 5 moves into contact with the back check 62, whereby the hammer 5 is blocked from further downward pivotal movement and stopped, which prevents occurrence of rebound or vibration of the hammer 5. Further, in this case, load due to the above-mentioned rebound of the hammer 5 is transmitted to the key 2. As a consequence, the player can definitely feel a stop feeling of the key 2 to be obtained at the time of full depression of the key 2.

Figure 13A:
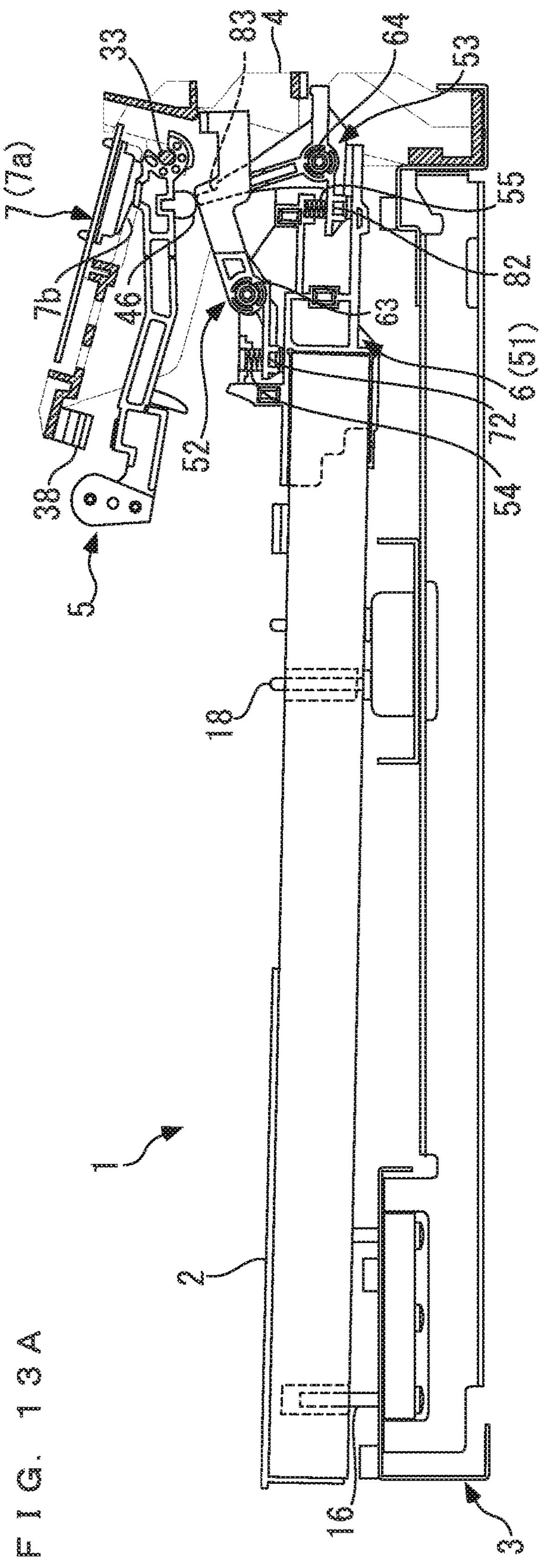

FIG. 13A shows a state in which the depressed key 2 is slightly (e.g. one third of keyboard depth) returned due to release of the key 2. When the key 2 is released from the above-described state shown in FIG. 12B, as shown in FIG. 13A, the front end of the key 2 moves upward, whereas the rear end thereof moves downward, and in accordance therewith, the action unit 6 moves downward in unison with the rear end of the key 2. In this case, the back check 62 moves rearward and obliquely downward, whereby the hammer 5 is released from the engagement with the back check 62 and the stopped state. Moreover, the repetition lever 52 has the front arm 72 pressed down by the urging force of the repetition spring 54, whereby the repetition lever 52 is pivotally moved about the repetition support shaft 63 in a counterclockwise direction as viewed in FIG. 13A. Similarly, the jack 53 has the front arm 82 pressed down by the urging force of the jack spring 55, whereby the jack 53 is pivotally moved about the jack support shaft 64 in the counterclockwise direction as viewed in FIG. 13A. With this, as shown in FIG. 13A, the upper end of the hammer push-up portion 83 of the jack 53 turns around into a position under the hammer protrusion 46 of the hammer 5, which consequently makes it possible for the action unit 6 to drive the hammer 5 even before the key 2 has not completely returned to its key-released position.

Figure 13B:
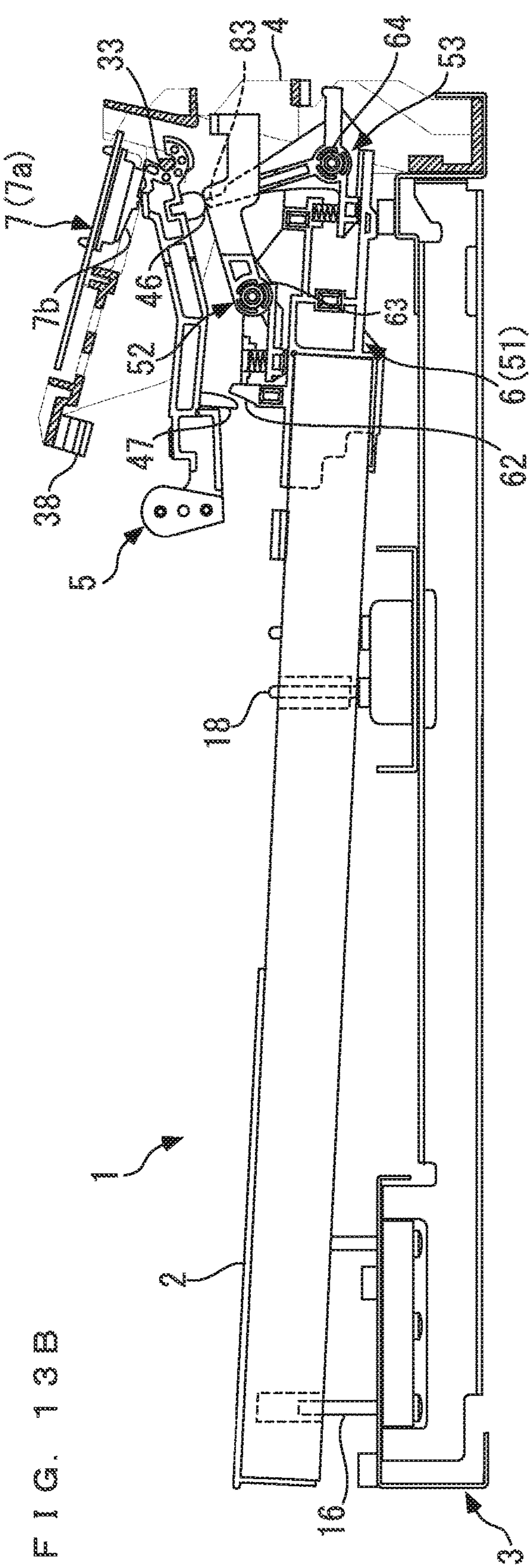

Note that when the key 2 is completely released, as shown in FIG. 13B, the key 2, the hammer 5, and the repetition lever 52 and the jack 53 of the action unit 6 return to their original key-released positions.

As described in detail heretofore, according to the present embodiment, by using the keyboard device 1 including the above-described key 2, action unit 6, and hammer 5, it is possible to realize the same operation as performed by a grand piano, whereby it is possible to obtain the same key touch feeling and performability as provided by the grand piano during musical performance. Further, for the action unit 6 of the keyboard device 1, not only the number of components but also the number of adjustment portions thereof can be reduced compared with an action of the grand piano, and hence it is possible to improve the productivity and maintainability of the keyboard device 1.

Note that the present invention is not limited to the above-described embodiment, but it can be practiced in various forms. For example, although in the above-described embodiment, the description is given of a case where the present invention is applied to the keyboard device of the electronic piano, the present invention is not limited to this, but the present invention can also be applied to a keyboard device in which in place of the key switches 7, the same strings as used in the grand piano are stretched above the hammers 5 and are struck with the hammers 5.

Further, details of the constructions of the keyboard device 1, the key 2, the hammer 5, and the action unit 6 shown in the embodiment are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A keyboard device for a keyboard instrument, including:

a key extending a predetermined length in a front-rear direction and configured to be swingable about a portion thereof at about a center of the key in a longitudinal direction thereof as a fulcrum;

an action unit provided on a rear portion of the key, for operating in conjunction with depression of the key;

a hammer support disposed rearward of the key; and a hammer extending a predetermined length in the front-rear direction and having a rear end thereof pivotally supported on a hammer support shaft extending in a left-right direction of the hammer support, the hammer being placed on the action unit via a protrusion formed immediately forward of the hammer support shaft such that the protrusion protrudes downward, for being driven upward by the action unit in accordance with depression of the key, wherein the action unit comprises:

a holder fixed to a rear end of the key;

a repetition lever having a jack guide hole extending through the repetition lever in a vertical direction and extending in the front-rear direction, the repetition lever being pivotally mounted to the holder, for placing the protrusion on an upper surface thereof at about the jack guide hole, the repetition lever moving upward in accordance with depression of the key to push up the hammer via the protrusion and thereby cause the hammer to pivotally move upward;

a jack having a hammer push-up portion extending in the vertical direction and pivotally mounted to the holder, the hammer push-up portion having an upper end thereof inserted into the jack guide hole of the repetition lever from below and engaged with the jack guide hole such that the upper end is movable in the front-rear direction, the jack pushing up the hammer by the hammer push-up portion via the protrusion from partway through upward movement of the repetition lever caused by depression of the key, to cause the hammer to pivotally move upward;

jack latching means for latching the jack partway through pushing-up of the hammer by the jack, thereby disengaging the hammer push-up portion of the jack from the protrusion; and jack returning means for returning the hammer push-up portion of the jack disengaged from the protrusion to its position before disengagement, when the depressed key is partway through returning to a key-released state.

2. The keyboard device according to claim 1, wherein the holder is formed as a molded article made of a synthetic resin, wherein the holder includes:

a key mounting portion fixed to the key, a repetition support shaft and a jack support shaft provided at respective predetermined locations rearward of the key mounting portion in a laterally protruding state, for pivotally supporting the repetition lever and the jack, respectively, wherein the repetition lever is formed as a molded article made of a synthetic resin and includes a repetition fitting hole for being pivotally fitted on the repetition support shaft, and wherein the jack is formed as a molded article made of a synthetic resin and includes a jack fitting hole for being pivotally fitted on the jack support shaft.

3. The keyboard device according to claim 2, wherein the jack includes a rear arm extending rearward from about the jack fitting hole, and wherein the jack latching means includes a jack stopper which is provided on the hammer support, for latching the jack by having the rear arm brought into contact therewith from below during key depression.

4. The keyboard device according to claim 3, wherein the jack includes a front arm extending forward from about the jack fitting hole, and wherein the jack returning means is formed by a spring for urging the front arm downward.

5. The keyboard device according to claim 1, wherein the hammer support includes a hammer stopper into which the hammer is brought into contact when the hammer is pivotally moved upward during key depression, for blocking further pivotal movement of the hammer, wherein the hammer includes a back check engagement portion protruding downward from a predetermined location of a bottom surface of the hammer, and wherein the holder includes a back check which stops the hammer by being engaged with the back check engagement portion when the hammer, which has pivotally moved upward during key depression and has contacted the hammer stopper, rebounds from the hammer stopper and pivotally moves downward.

* * * * *